United States Patent
Narvaez

(10) Patent No.: US 7,447,204 B2
(45) Date of Patent: Nov. 4, 2008

(54) METHOD AND DEVICE FOR THE CLASSIFICATION AND REDIRECTION OF DATA PACKETS IN A HETEROGENEOUS NETWORK

(75) Inventor: Paolo Narvaez, Sunnyvale, CA (US)

(73) Assignee: RMI Corporation, Cupertino, CA (US)

( * ) Notice: Subject to any disclaimer, the term of this patent is extended or adjusted under 35 U.S.C. 154(b) by 744 days.

(21) Appl. No.: 10/766,695

(22) Filed: Jan. 27, 2004

(65) Prior Publication Data

US 2004/0258062 A1    Dec. 23, 2004

Related U.S. Application Data

(60) Provisional application No. 60/443,159, filed on Jan. 27, 2003.

(51) Int. Cl.
H04L 12/56    (2006.01)
(52) U.S. Cl. .................... 370/389; 370/392; 370/412; 370/414; 719/328
(58) Field of Classification Search ............... 370/392, 370/395.5, 412, 414, 389, 469; 719/414.328; 710/5
See application file for complete search history.

(56) References Cited

U.S. PATENT DOCUMENTS 6,957,281 B2 * 10/2005 Mann et al. .................... 710/5

2002/0188732 A1    12/2002    Buckman et al.
2006/0159019 A1 *  7/2006    Buskirk et al. ............... 370/235

FOREIGN PATENT DOCUMENTS

| EP | 0 993 153 | 12/2000 |
|---|---|---|
| WO | WO 02/060098 | 8/2002 |
| WO | WO 02/076042 | 9/2002 |

* cited by examiner

Primary Examiner—Brenda Pham
Assistant Examiner—Henry Baron
(74) Attorney, Agent, or Firm—Pillsbury Winthrop Shaw Pittman LLP

(57) ABSTRACT

A system and method for classification of data units in a network device acts as a bridge in heterogeneous networks, provides many different services and provisions many different transport mechanisms. The data classifier generates an ID that is internally used by the network device in managing, queuing, processing, scheduling and routing to egress the data unit. This internal ID enables the device to accept any type of data units from any physical/logical ports or channels and output those data units on any physical/logical ports or channels that are available. The device utilizes learning on a per-flow basis and can enable the device to identify and process data units used in private line services and private LAN services.

38 Claims, 7 Drawing Sheets

METHOD AND DEVICE FOR THE CLASSIFICATION AND REDIRECTION OF DATA PACKETS IN A HETEROGENEOUS NETWORK

CROSS-REFERENCE TO RELATED APPLICATIONS

This application claims the benefit of priority under 35 U.S.C. §119(e) from U.S. Provisional Application No. 60/443,159 to Paolo Narvaez, filed Jan. 27, 2003 and entitled "Classification of Packets in a Heterogeneous Data Redirection Device," which is fully incorporated by reference in its entirety and for all purposes.

BACKGROUND OF THE INVENTION

1. Field of the Invention

Generally, the present invention relates to the telecommunications and digital networking. More specifically, the present invention relates to the classification of packets in a heterogeneous data redirection networking device.

2. Description of the Related Art

In the realm of digital networking and telecommunications, data is often assembled and then transmitted and received in certain discrete units known as packets. All or a specified number of the packets originating from the same source device, connection or application can be grouped together in a "flow." Though the term "packets" is used in this discussion, "packets" may also refer to other discrete data units such as frames and so on. Network devices (e.g. switches, routers, etc.) that intercept and forward such flows or packets are often configured with a plurality of ingress ports (i.e., into which input flows arrive at the device) and a plurality of egress ports (i.e., from which input flows are routed outside the device). In this regard, and for purposes of the present invention, ports may be physical, logical or a combination of physical and logical. Further, ports may be bidirectional in nature such that they may serve as both ingress ports and egress ports. When an input flow or single input packet is received by a network device it could have be destined for output over just a single egress port or more than one egress port. An input flow/packet with just a single destination egress port is referred to as unicast, while a flow/packet that is destined for multiple egress ports is referred to as multicast.

Certain network devices may be classified as heterogeneous in that they may accept data (e.g., via ingress ports) of many different types and forward such data (e.g., via egress ports) in many different formats or over different types of transmission mechanisms. Examples of such devices include translating gateways that unpack data in one format and repackage it in yet another format. For purposes of the present invention, a heterogeneous network is considered the general case for those non-heterogeneous networks (i.e., those networks that accept and forward only one type of data over one type of transmission mechanism); as such, these non-heterogeneous networks are meant to be within the scope of this invention. When a two-port non-heterogeneous device merely forwards data from its one ingress port to its one egress port, there is less of a need to classify the packets. However, in devices where there are multiple types of ports (e.g., ingress, egress, ingress/egress combination, varying data formats, varying physical connections, etc.) and, where the physical ports may be combined or section into one or many logical ports, there is a critical need for packet classification.

FIG. 1 illustrates a heterogeneous network environment that provides for different types of data formats and marries different transport mechanisms. As will be evident to those skilled in the art, many different combinations of such formats and transport mechanisms (as well as many others) can be combined to form such a network environment. A network ring 100 may, for example, include a high capacity network such as a SONET ring and usually provides service to more than one customer. Such customers may further distribute the service(s) they receive via the network ring 100 to one or more nodes behind their own internal network. FIG. 1 shows nodes 110, 120, 130, 140, 150, 160 and 170. Nodes 140 and 150 are access the network ring 100 via the same. Customer Premises Equipment (CPE) 145. Similarly nodes 130 and 170 access the network via CPE 135. The remaining nodes directly access the network ring 100. CPE 145 and 135 may, for example, be gateways that apportion transport mechanisms such as Ethernet or PDH (e.g., T1 lines, T3 lines, etc.) over the network ring 100, making use of the bandwidth given thereby. As mentioned above, network ring 100 can be a carrier-class network that may have a very large bandwidth, for example, such as 2.5 Gigabits per second (Gb/s).

Therefore, network ring 100 is generally not like a typical Local Area Network (LAN) service or a typical point-to-point leased line service. Recent efforts, however, have sought to provide both of these types of services in an environment such as that shown in FIG. 1. The first, called "Private Line Service" or "Ethernet Private Wire Service," for example, is an attempt to create a secure and dedicated leased line type of mechanism. For instance, assume a dedicated connection-oriented service was desired between node 130 and node 110, which belong to the same organization B, yet might be separated by a long physical distance. A Private Line Service could be used to provide the node 130 to node 110 services. Private Line Service would create a point-to-point, dedicated interconnect between node 110 and node 130 even though both are segregated over the network ring 100.

Yet another service, known, for example, as a Transparent LAN or Ethernet Private LAN Service, is an attempt to create a virtual Local Area Network (LAN) out of those nodes that belong to the same customer. For instance, if nodes 120, 140, 150 and 170 (i.e., all belonging to the same customer organization A) were part of a virtual LAN using the network ring 100, they would appear to one other as being on the same customer A LAN, even though node 120 might be separated a great distance from nodes 140, 150 and 170. Further, the nodes would appear on the same LAN even though all four nodes might be operating under different transport mechanisms (e.g., if Transparent LAN services were enabled). Likewise, another Transparent LAN service could enable nodes 110, 130 and 160, which all belonging to customer organization B, to appear to be on B's LAN.

Yet another challenge of provisioning such services over network ring 100 is from the standpoint of the CPEs, such as CPE 135 and CPE 145. The CPE must consider provisioning the services so that the nodes (e.g., end client or users) can accurately be identified according to their network flows and be distinguished from one another. Since the actual network is not precisely connection-oriented, the CPEs should be capable of distinguishing data units belonging to organization A from those belonging to organization B. Further, where both Private Line and Transparent LAN services are be present and both seek to be provisioned on the same CPE, such services should be distinguished by the CPE. When a CPE also has the task of allocating its resources, scheduling and routing data units, determining egress ports and so on, packet classification becomes much more difficult. Further, where a CPE might support the provisioning of T1 lines to one node and Gigabit Ethernet or 10/100 Ethernet to another node, the CPE must be able to classify and distinguish among such packet types internally.

While CPEs 135 and 145 could simply be built with many different physical ports and large memories, such a CPE is cost-inefficient to the customer. Further, such a CPE does not scale well where the customer desires many different channels or logical ports over the same physical ingress or egress port. Recently, there are efforts underway to provide scalable CPEs that can operate on less hardware and thus, with less cost and complexity than their predecessors, but while still providing better performance than their predecessors. However, in such efforts, classification of data becomes important as functions such as prioritizing and scheduling data units and allocating limited CPE physical resources (e.g., memory and processing cycles) come to the fore. Further, where logical and physical ports are bidirectional in nature, having both egress and ingress capability, scheduling and allocating become vital to the proper operation of the network.

Thus, what is needed is a networking device with a data classifier that can cheaply and efficiently be used for managing, queuing, processing, scheduling and routing data units between multiple ingress/egress ports and between varying transmission media and transmission formats.

SUMMARY OF THE INVENTION

What is disclosed is a system and method for classification of data units in a network device that acts to bridge heterogeneous networks, provides many different services and provisions many different transport mechanisms. The data classifier, which is one subject of various embodiments of this invention, generates an ID internally used by the network device in managing, queuing, processing, scheduling and routing to egress the data unit. This device-internal ID enables the device to accept any type of data units from any physical/logical ports or channels and output those data units on any physical/logical ports or channels that are available. It also enables the device to identify data units used in Private Line Services and Transparent LAN services, among others.

The data classifier in accordance with the various embodiments of the invention is configurable and will behave differently depending upon the physical port to which it is interfaced. Within a given port, further, the data classifier can distinguish among physical or logical ports and can be further configured to behave differently, if needed, according to the characteristics of the physical or logical port.

In at least one embodiment of the invention, the classification consists of tag extraction and then tag lookup. The tag lookup generates a flow ID and a priority ID that are combined to give the device-internal queue ID. In devices that provide link aggregation, a balancing component can enable generation of a balanced flow ID as well.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The attached Appendix forms a part of the present disclosure and is incorporated herein by reference.

Figure 1:
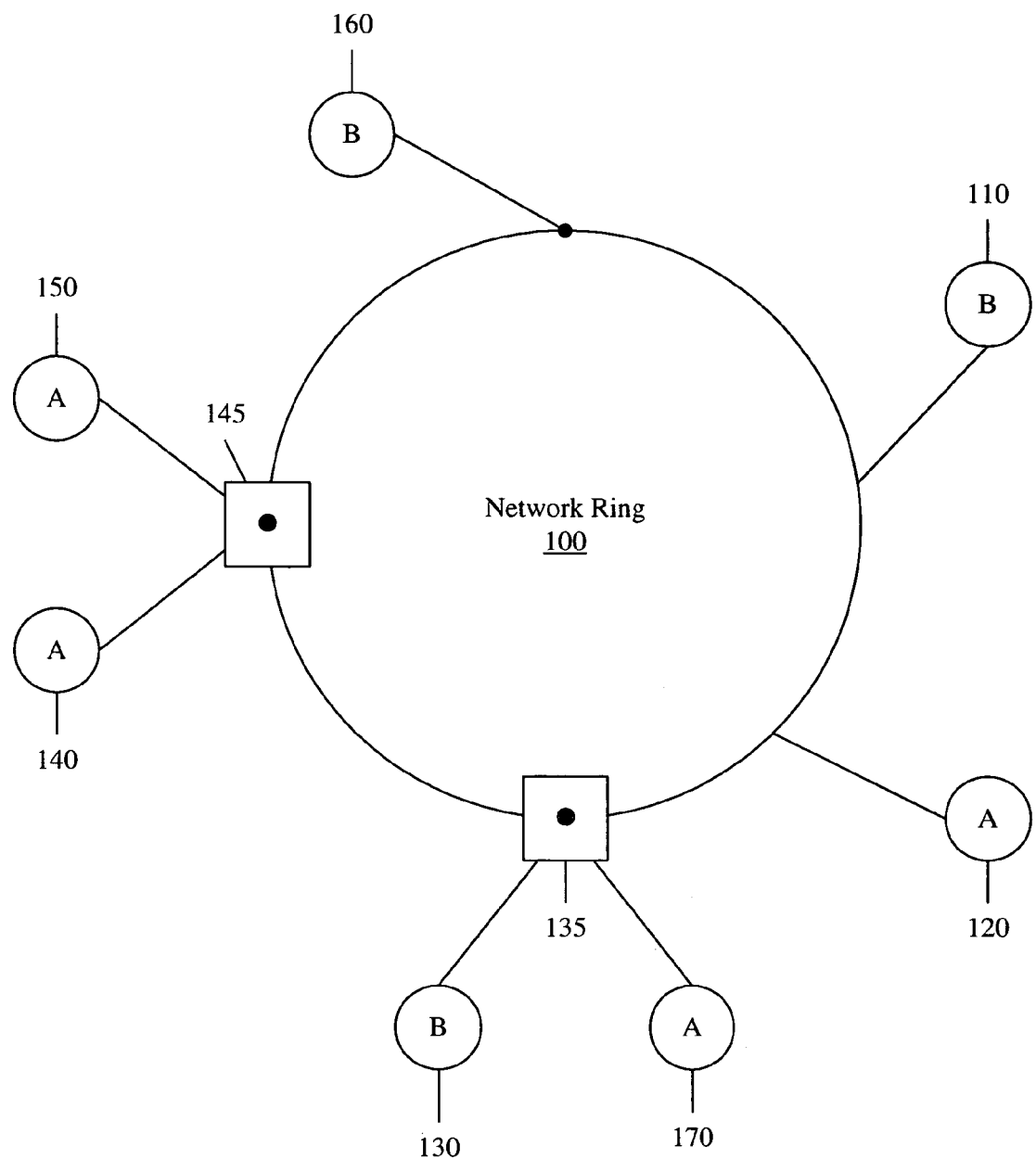
FIG. 1 illustrates a heterogeneous network environment that provides for different types of data formats and marries different transport mechanisms.
Figure 2:
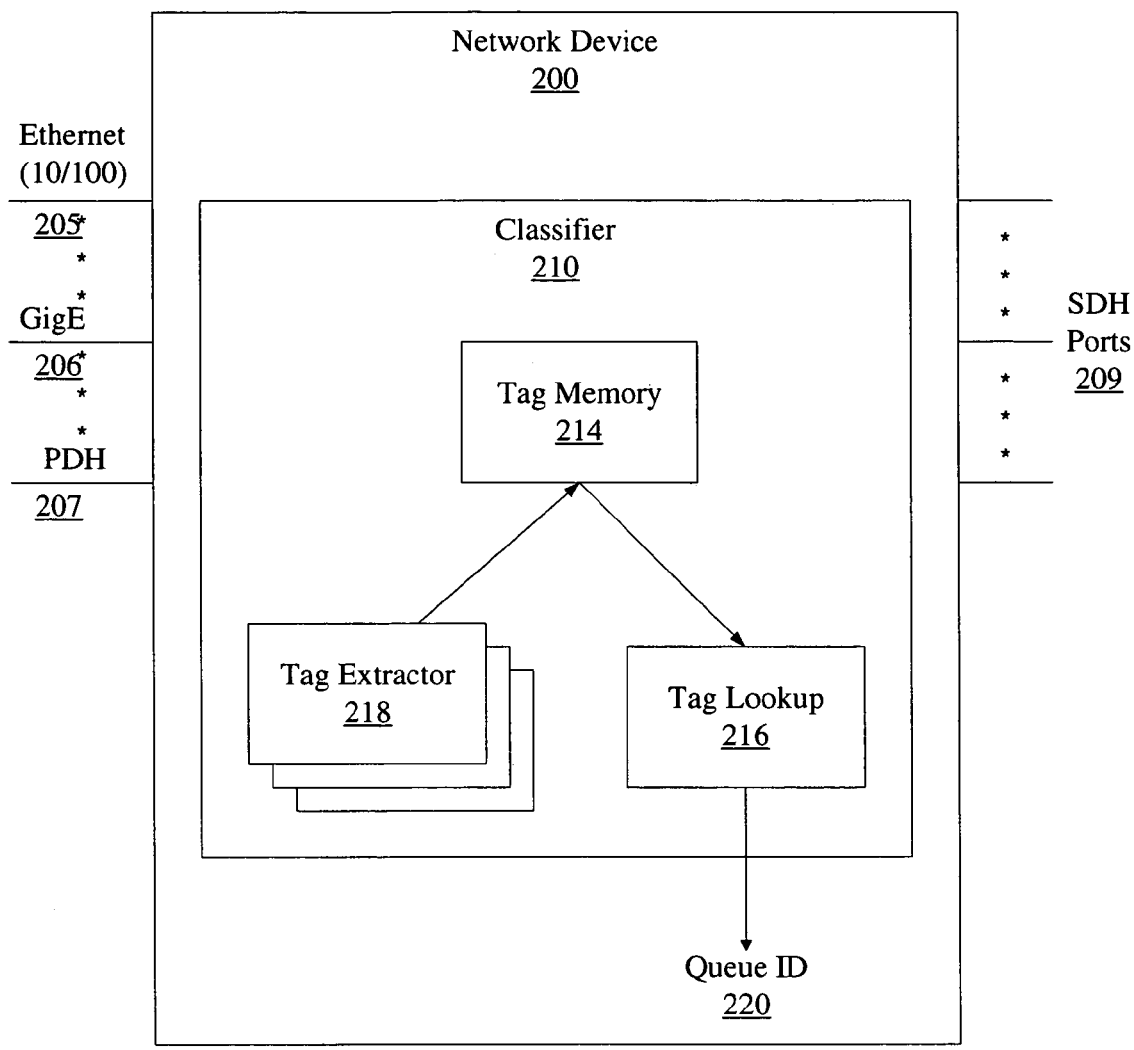
FIG. 2 illustrates at least one embodiment of the data classifier as deployed in a network device according to the present invention.

FIG. 2 illustrates at least one embodiment of the data classifier as deployed in a network device according to the present invention. A network device 200 is shown as having a plurality of physical ports 205, 206, 207, 209 that can interface to varied and/or different transport mechanisms. Each of the ports 205, 206, 207 and 209 may also support one or more logical ports or channels. In this embodiment, port(s) 205 interfaces to a typical Ethernet service, such as a 10/100 network; port(s) 206 interfaces to a higher capacity GigE, or Gigabit Ethernet service; port(s) 207 interfaces to a PDH type services, such as T1 or T3; and ports 209 can be SDH-capable ports that interface to a carrier-class service, such as SONET. This configuration is intended to show one of many possible supported network interfaces and configurations, and is only intended to exemplify a complex network interface device 200 that supports a wide variety of networks, transmission/transport schemes and associated protocols.

As shown in FIG. 2, a classifier 210 according to the present invention generates a Queue ID 220, which is internal to the device 200. The Queue ID 220 is composed of an internal Flow ID and a Priority ID (discussed further, below). The Queue ID 220 is used by device 200 to decide on which queue to store any given ingress packet before it gets scheduled (also discussed further, below). The classifier 210 includes a set of tag extractors 218, a tag memory 214 and a tag lookup 216.

For example, the classifier 210 can be coupled to the ports available on the device 200 (e.g., ports 205, 206, 207 and 209) to accept a first portion of every packet that ingresses on these ports. Each of the tag extractors 218 interfaces can be associated with one of the ports 205, 206, 207 and 209 and can check the first portion of every packet to see if the right type of packet (i.e., one that is compatible with that port's configuration) is received. Tag extractors 218 (discussed further below) use this first portion of the packet (e.g., in some embodiments, the first 32 or 64 bytes) to build a set of tags.

The generated tags include, among other things, information on the customer and external flow/service (i.e., Transparent LAN), Media Access Control (MAC) source and destination, and link aggregation conversation information. The generated tags can then be stored in tag memory 214.

Once the tags for a packet are completed, the tag lookup engine 216 will read the tags serially from the Tag Memory 214 and perform a lookup. The lookup returns both a Flow ID and Priority ID (and if link aggregation is used, a balanced Flow ID), which are then combined to make up the Queue ID 220. One embodiment of a tag lookup engine, such as engine 216, is discussed in detail below.

Figure 3:
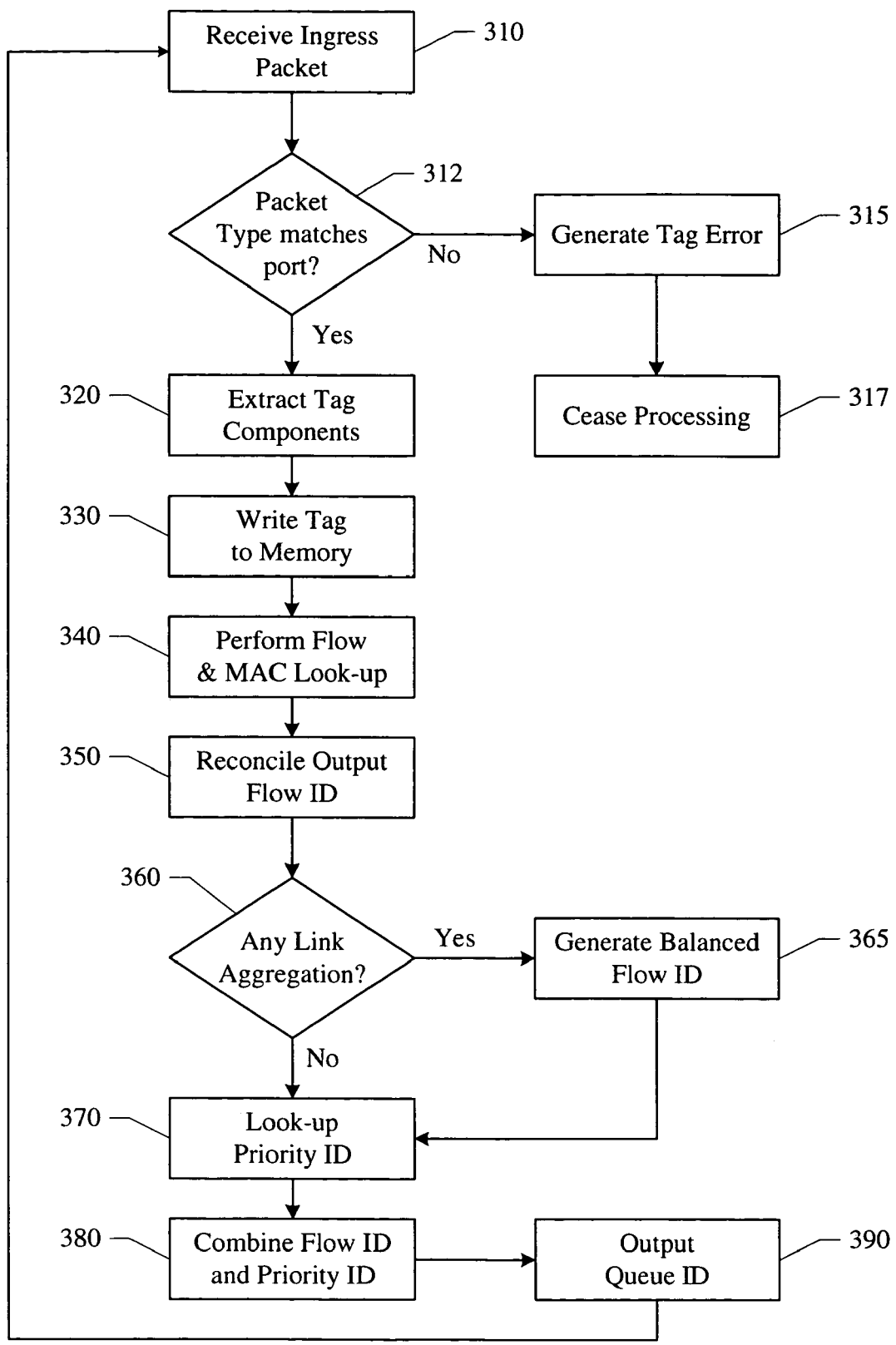
FIG. 3 illustrates a flowchart of a classification technique according to at least one embodiment of the invention.

FIG. 3 illustrates a flowchart of a classification technique according to at least one embodiment of the invention. As shown in FIG. 3, a packet that ingresses into one of the many ports of the device is received 310. The packet type of the received packet is checked 312. If the checked packet type does not match the port type for which the packet was configured or to which the packet is destined 312, then a tag error is generated 315 and processing ceases 317 since the received packet is errant. If the packet type of the port over which the packet was received matches the port type, then tags are extracted 320. If the tag extractor finds an error with a tag during extraction, default tag values can be assigned instead (as discussed in further detail, below).

After the tags are extracted 320, according to this embodiment, the tags can be written to a memory so that they can be accessed at a later time 330. A lookup using the tags is then performed, which first includes a flow tag lookup and a MAC destination address tag and MAC source address tag lookup 340. Based on these tags, an output Flow ID is reconciled 350. If there is link aggregation present 360, then a Balanced Flow ID is also generated 365. Next, after obtaining the Flow ID and/or the Balanced Flow ID, a lookup for the Priority ID tag is performed 370. The Flow ID or, if generated, the Balanced Flow ID, is then combined with the Priority ID 380. The result of this combination, the Queue ID, is then output from the classifier 390. The process then repeats itself for subsequently received ingress packets. Details for performing the processes outlined in FIG. 3 are discussed in greater detail below.

Figure 4:
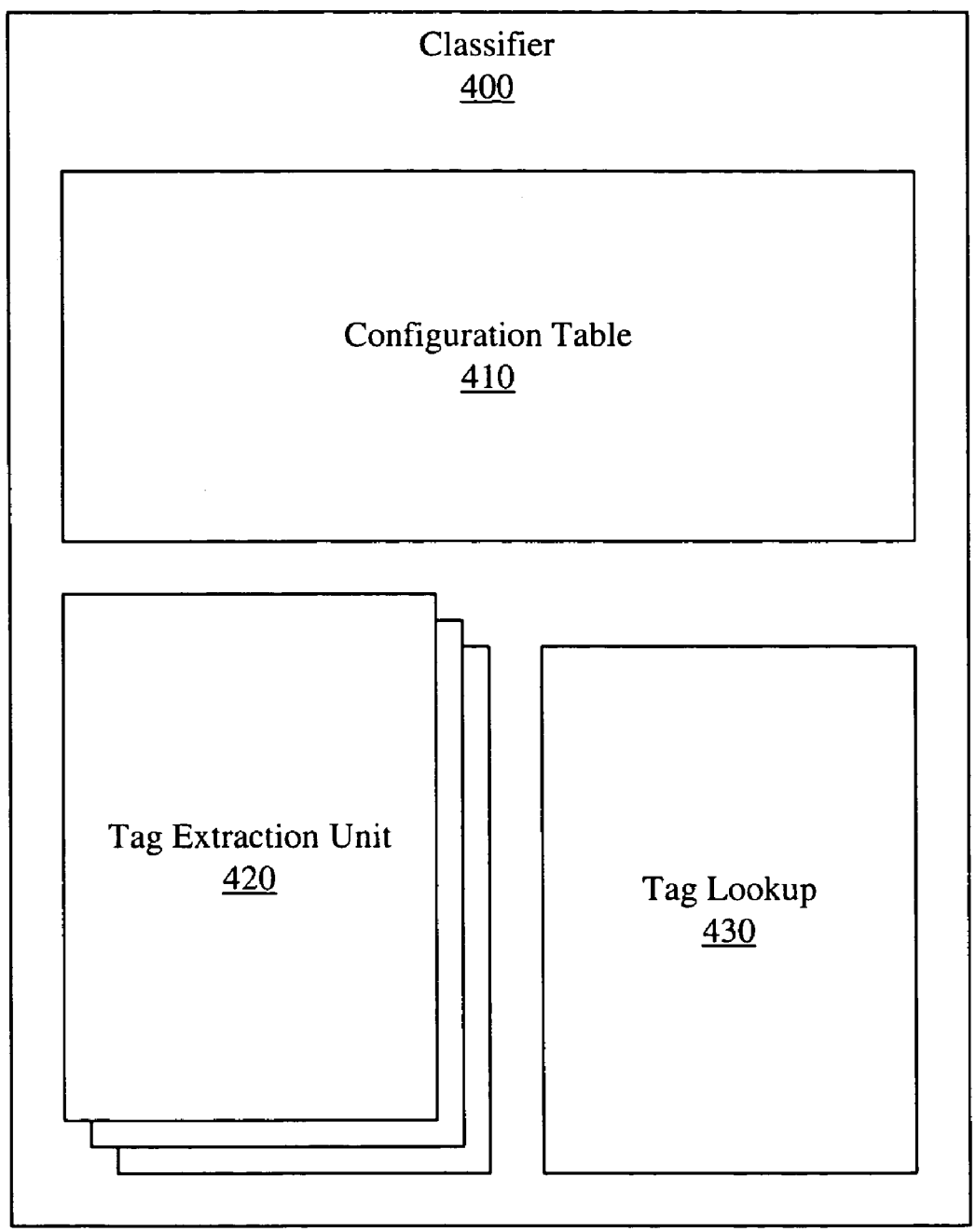
FIG. 4 illustrates a block diagram of a classifier according to at least one embodiment of the invention.

FIG. 4 illustrates a block diagram of a classifier according to at least one embodiment of the invention. As shown in FIG. 4, classifier 400 consists of a Tag Extraction Unit 420, a Tag Lookup 430 and a Configuration Table 410. The Tag Extraction Unit 420 consists of a plurality of instances of a tag extractor, one for each port in the device (see FIG. 5 and associated description). The Tag Lookup 430 consists of a sequence of lookup operations that are performed on the extracted tags generated by the Tag Extraction Unit 420. The Tag Extraction Unit 420 (and its associated extractors) operates differently on each of the available ports that interface to the classifier 400. This per-port configurability of the tag extraction mechanism is handled by a Configuration Table 410. Each of the ports has an entry in the Configuration Table 410 which specifies how a tag should be extracted (by the Tag Extraction Unit 420) for packets at that port. Configuration Table 410 would include information such as parity bit selection, start and end position of tags and fields as well as length of tags and fields when needed.

Figure 5:
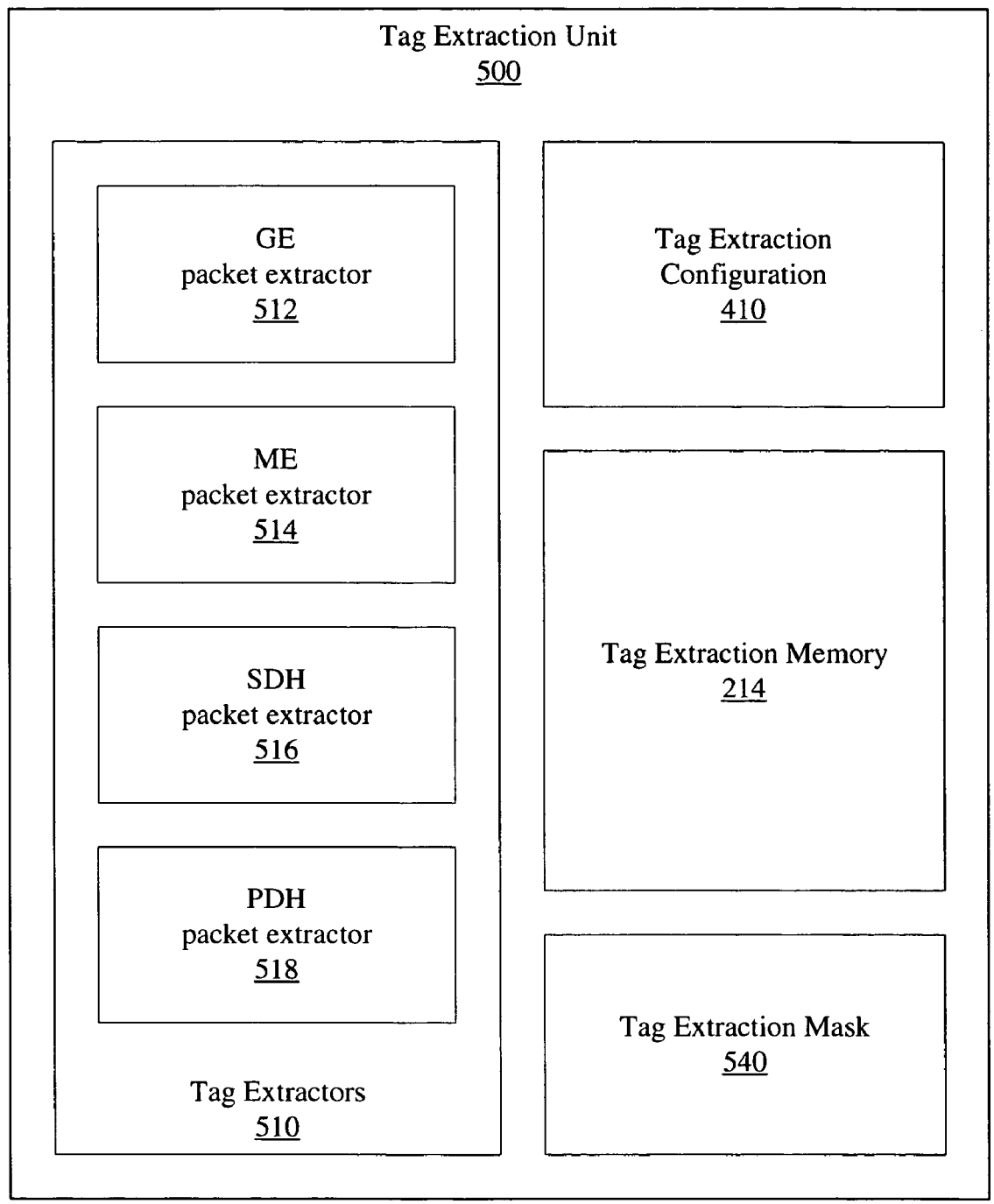
FIG. 5 illustrates a block diagram of a tag extraction unit according to at least one embodiment of the invention.

FIG. 5 illustrates a block diagram of a tag extraction unit according to at least one embodiment of the invention. As shown in FIG. 5, the Tag Extraction Unit 500 can consist of a number of packet tag extractors 510, for example: a GE (GigE) packet extractor 512, a ME (Ethernet) packet extractor 514, a SDH (SONET) packet extractor 516, and a PDH packet extractor 518. However, fewer or additional packet extractors might be included. The Tag Extraction Unit 500 can also consist of a tag extraction configuration block 410, an extraction memory 214, and an extraction mask block 540.

In this exemplary embodiment, each of the tag extractors 510 can consist of numerous separate extraction components, for example management flag extraction, error flag extraction, type tag extraction, flow tag extraction, MAC tag extraction, priority tag extraction, and balancer tag extraction, each is discussed in further detail below.

Management Flag Extraction

The management flag can be used to distinguish a management packet from other packets and can be as simple as a single bit. Packets received from all types of ports might, for example, be accompanied with an Extract Management Indicator (EMI). When the EMI is asserted at the start of classification (SOC), and when the EMI is enabled by the extraction configuration for that logical port, the received packet can labeled as a management packet.

Error Flag Extraction

The error flag can be used to indicate errant packets. For example, a 3-bit error flag can be used to mark that a received packet is incorrectly extracted, where, for example:

Bit 2 (flow error) of the error flag can be set if either the type tag or flow tag extraction configurations has an error, or if the end of classification (EOC) occurred before the packet type tag or flow tag extraction was complete;

Bit 1 (MAC error) of the error flag can be set if the MAC tag extraction configuration has an error, or if the EOC occurred before the packet MAC tag extraction was complete; and Bit 0 (balancer error) of the error flag can be set if the balancer tag extraction configuration has an error, if the balancer tag is configured to be zero length, or if the EOC occurred before the packet balancer tag extraction was complete.

Type Tag Extraction

The type tag extraction can obtain information used to verify whether the arriving packets are of the same type as any given logical port. The flow, MAC, priority, and balancer tag extraction uses the same tag extraction configuration for every packet arriving on the same logical port. If a different type of packet arrives on a logical port, the packet will be incorrectly extracted and misclassified.

The extraction can be accomplished, for example, by obtaining bytes that contain, for example, 0 to 16 contiguous bits belonging to the first 64 bytes of a packet. The position of the first bit and the tag length is configurable per logical port (via the tag configuration 410). The value of these extracted bits should match that of the pre-configured value for that port. If not, the packet type is probably not valid, and the packet can be marked as an error packet. A configuration error is flagged for the received packet if its logical port is configured to extract a type tag with length greater than 16 bits, or if the starting bit plus the length falls outside of the first 64 bytes. As should be obvious to those skilled in the art, this extraction can easily be applied to byte-lengths of packets and with varying bit-lengths of extractions. An extraction error can be flagged for the received packet if there is a type tag extraction configuration error for that logical port, or if the EOC occurred before the extraction was complete.

Flow Tag Extraction

The flow tag obtains information used to identify a customer flow. The extraction is accomplished, for example, by obtaining 2 non-overlapping fields of contiguous bits up to 64 total from the first 64 bytes of a packet. The position of the first bit and length of both fields are configurable per logical port (via the tag extraction configuration 410). The 10-bit Logical Port ID (LPID) from which the packet was received can be appended in front of the two fields to form the flow tag.

MAC Tag Extraction

The MAC tag obtains information used for MAC destination lookup and source learning. The extraction is accomplished, for example, by obtaining 12 contiguous bytes from the first 64 bytes of a packet. The position of the first byte is configurable per logical port. The first 6 bytes are the MAC destination address, and the last 6 bytes are the MAC source address. A configuration error can be flagged for the received packet if its logical port is configured to extract MAC tag with the starting byte plus 12 falls outside of the first 64 bytes. A MAC error can be flagged for the received packet if there is a MAC tag extraction configuration error for that logical port, or if the EOC occurred before the extraction was complete.

Priority tag extraction

The priority tag extraction obtains information used to determine the priority of the received packet. The extraction can be accomplished, for example, by obtaining 3 contiguous bits from the first 64 bytes of a packet. The position of the first bit is configurable per logical port. The priority tag will default to all zeros if the starting bit plus 3 falls outside of the first 64 bytes, or if the EOC occurred before the extraction was complete.

Balancer Tag Extraction

The balancer tag extraction obtains information used to determine the link aggregated customer flow. The extraction is accomplished, for example, by obtaining the 5-bit CRC (Cyclic Redundancy Check) of up to 15 contiguous bytes from the first 64 bytes of a packet. The position of the first byte and the length of the tag are configurable per logical port. The CRC function can be, for example, a polynomial function, $x^5+x^2+1$, with an initialization value of all ones. While this exemplary polynomial is generally used for a USB token ring, other functions can also be employed. A configuration error can be flagged for the received packet if its logical port is configured to have the starting byte plus the length falls outside of the first 64 bytes. A balancer error can be flagged for the received packet if there is a balancer tag extraction configuration error for that logical port, or if the length is zero, or if the EOC occurred before the extraction was complete. The balancer tag will default to all ones, the initialization value, if a balancer error is flagged.

The tag extraction configuration block 410 can include all of the information necessary for determining where in a packet to obtain information for building a tag that is valid for the port over which the packet was received, and to which the packet might egress. Each port in the system can have a different packet stream and thus, tags for packets originating in that port should be constructed differently.

The memory 214 can, for example, store the resultant tags as the extractor builds them and store part of the extraction configurations at the EOC. When a tag lookup request is received, the memory 530 can retrieve both the extraction configuration from the tax extraction configuration 410 and the tag(s). The memory 530 can be logically organized into 369 logical FIFOs (if, for example, there were a total of 369 ports in the system). Each FIFO can hold a number of tags for each logical port (e.g., 4 tags per port). New tags created by the tag extractors 510 can be written to the tail of the FIFO corresponding to each tag's logical port. Tags to be looked up might be read out from the head of the FIFO.

The Tag Extraction Mask 540 can be, for example, a mechanism for stripping out unnecessary information from tags stored in the memory 530 when they are ready to be transferred from the tag extraction unit 500 (or, for instance, Tag Extraction Unit 420) to the Tag Look-up (for instance, Tag Look-up engine 430).

Figure 6:
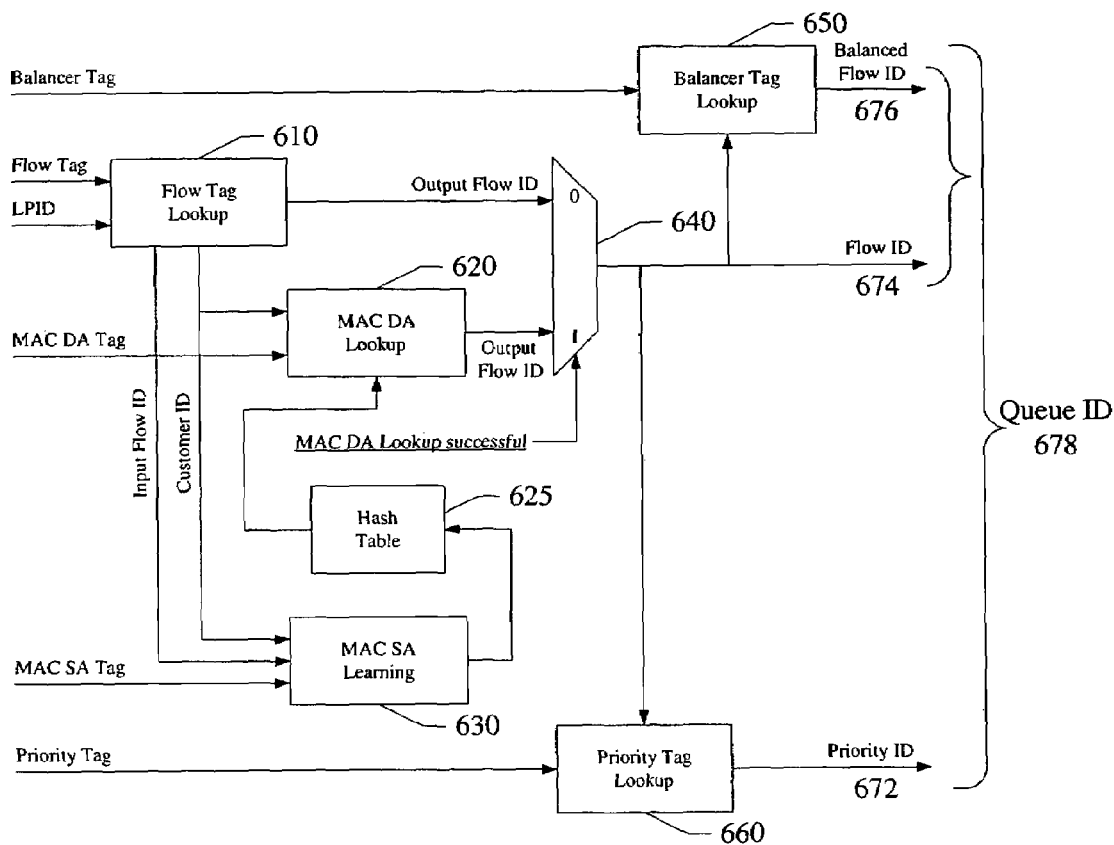
FIG. 6 illustrates a diagram of a tag lookup engine according to at least one embodiment of the invention.

FIG. 6 illustrates a diagram of a tag lookup engine according to at least one embodiment of the invention. Once a tag is stored in the tag memory, the tag lookup engine 600 in the classifier can fetch the tag (e.g. using the appropriate tag extraction mask 540) and perform a search using one or more of the 5 fields stored in the tag (e.g., input flow ID, output flow ID, customer ID, MAC DA and MAC SA). When the full search is completed, the tag lookup engine 600 can output a Flow ID 674 of the packet, as well as a Priority ID 672. When link aggregation is used, the lookup engine can also output a Balanced Flow ID 676. The Balanced Flow ID can be used, for example, to perform load-balancing of a single Ethernet logical port over multiple physical ports. A Queue ID 678, which is the output of the classifier, is then generated by combining the Flow ID 674 (or Balanced Flow ID 676) and the Priority ID 672.

According to this exemplary embodiment, the flow tag lookup engine 610 can be implemented using a binary search tree. The values in the tree can be computed by software and downloaded into the device that integrates the classifier. These values can be changed dynamically by software or firmware. A shadow set of values can also be present and the switchover can happen hitlessly. The binary search tree can be implemented in any number of ways, many of which are well-known in the art.

As shown in FIG. 6, the upper-left block of the tag lookup engine 600 is the flow tag lookup 610. The flow tag lookup 610 includes the task of finding the input flow ID, output flow ID and customer ID of a given packet (or Tag for that packet). It can accomplish this by using the previously extracted flow tag and finding the corresponding values. This correspondence can be based on an exact match or a set of ranges.

The output of the flow tag lookup 610 includes of a customer ID, an output flow ID and an input flow ID. The customer ID can be, for example, a value identifying which one of a group of customers (for instance, 256 customers) owns the packet (e.g., the customer ID could be the same as a carrier Virtual LAN tag). The output flow ID can indicate the internal flow to be used for routing the packet internally to the correct egress port. The input flow ID is functionally equivalent to the output flow ID, but for transmission in the reverse direction (i.e., the internal flow/path to be used to route the return packet back to the input). The input flow ID is needed in order to do learning (discussed further, below).

In many cases, the flow tag lookup 610 may not be sufficient to accurately route a packet to the correct destination port. For example, the output flow ID from the flow tag lookup 610 might simply provide information to broadcast the packets to all remote hosts belonging to the same customer (e.g., multicasting). In such cases, a more precise destination lookup using MAC addresses is required.

The MAC destination address (DA) lookup 620 uses the customer ID (from the flow tag lookup 610 ) as well as the MAC DA Tag to find a more precise output flow ID. The output of the MAC DA lookup 620 will only be valid (i.e., valid over the output flow ID from the flow tag lookup 610) if the MAC address has been previously learned or programmed by the device (more on learning below). The MAC DA lookup 620 uses a hash table 625 with an appropriate number of entries (e.g., 256 entries, etc.) to store learned MAC addresses (along with their corresponding customer ID information). Hashing conflicts are resolved by using a list that is N entries deep. The output of the hash table 625 is the output flow ID used to internally route the packet to a proper, or better, output port.

If the MAC DA lookup 620 returns a valid result, it becomes the Flow ID of the packet. On the other hand, if it returns a null result (e.g., if the MAC address has not yet been learned or programmed), the default output flow ID from the flow tag lookup will be used instead. This logic is controlled by a selector mechanism 640, which uses a signal indicating whether the MAC address lookup was successful, or valid (i.e. if the MAC address had been previously learned or programmed, for example, the lookup would be successful, otherwise not).

MAC source address (SA) learning 630 can be used to associate a given MAC address and customer ID with a resulting output flow ID. Whenever a new packet arrives, the MAC source address tag of the packet can be used for learning. In this case, the source MAC address and the customer ID (e.g., provided by the flow tag lookup engine 610) will be associated with the input flow ID (e.g., also provided by the flow tag lookup engine 610). The values can be written into one of the entries in the hash table 625. After a programmable time interval, the previously learned entries will age and will no longer be used by the MAC DA lookup engine 620. The aging time interval can be, for example, 16 clock cycles.

Unlike the learning schemes of the typical Private LAN of today, which performs on-the-fly learning on a per-port basis, the MAC SA learning 630 of the present invention is a per-flow learning scheme. According to an exemplary embodiment, each learned customer/MAC combination can be associated with a flow, is instead of a port as is typical today. Thus, once the customer/MAC lookup is performed via the MAC SA learning 630, much more information is available, other than merely to which egress port(s) the packet is destined. For example, the input flow ID, output flow ID, MAC SA/DA, customer ID can all be available to the network, which equates to a more detained granularity in the data handling. This detailed granularity allows the network device of the present invention to provide meaningful quality of service (QOS) management. As contrasted to the technologies of today, which do not allow for QOS management at such a network device.

Whenever link aggregation is used, a group of physical ports are programmed to act as a single logical port. In such cases, an additional balancer tag lookup 650 is utilized to distribute packets across the different physical interfaces that constitute that one logical interface. The balancer tag lookup 650 should make sure that any two packets belonging to a single conversation are sent on the same physical interface. This helps to ensure that all packets belonging to the same conversation will be delivered in order. On the other hand, the balancer tag lookup 650 should also load-balance the traffic from different conversations effectively across all applicable physical interfaces of that one logical interface to maximize bandwidth requirements.

The balancer tag lookup 650 uses a function to obtain a hash value of the conversation tag. The hash value is then used to index a table that indicates the physical interface (or interfaces) to be used by the packet. The new flow ID obtained by the balancer tag lookup 650 is called a Balanced Flow ID 676. Since two equal conversation tags produce the same hash value, all packets from the same conversation are guaranteed to have the same balanced flow ID 676 and hence use the same physical port(s).

The flow ID 674 (i.e., from the flow tag lookup 610 or MAC DA lookup 620) can be used as an input to a priority tag lookup 660 to find the priority ID 672. For example, a k-bit flow ID 674 can be combined with the n-bit priority tag to make a (k+n)-bit data item within the priority tag lookup 660. The priority tag lookup 660 can, for example, consist of a large table with 2*(k+n+1) entries, where each entry can have, for example, a 2-bit value. The looked-up 2-bit value can then become the internal Priority ID 672 of the incoming packet.

For non-error and non-management packets, the flow ID 674/676 (output of the flow tag lookup 610 or MAC DA lookup 620 blocks, sometimes modified by the balancer tag lookup 650) and the Priority ID 672 (output of the priority tag lookup 660) are concatenated. For example, the bits from the Flow ID 674/676 are the most significant bits while the Priority ID 672 forms the least significant bits. This combined value can be the Packet Queue ID 678. It can determine into which of the external packet queues the packet of interest will be written. This is the classifier output.

If a given flow tag has been marked as an error, the output of the lookup will also be an error indication, regardless of the contents of the tag. If the tag is marked with an error, the output of the lookup engine will have the error bit enabled. This invalidates whatever Queue ID 678 value is generated and indicates the corresponding packet should be dropped.

Figure 7:
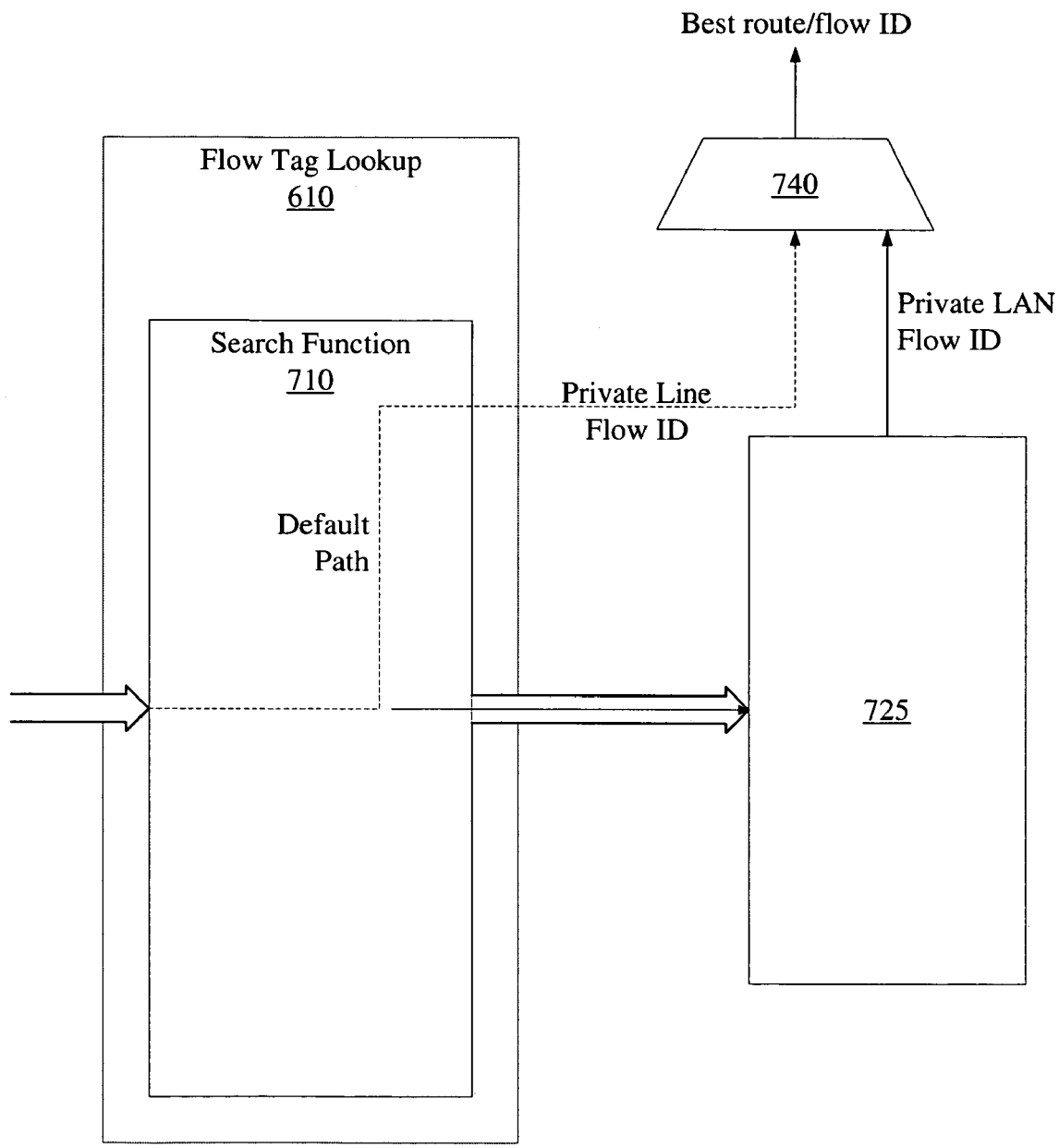
FIG. 7 illustrates an embodiment of the invention in which both private line and private LAN services can be accommodated in a single classifier device, and thus in the same network hardware.

The system and methods described above can simultaneously be applied to private line services and private LAN services, as required. In systems that support both of these services, keeping track of the flow internally within the device through which the packet is being forwarded can help ensure that the packet is placed on an egress port such that it maintains its membership to a particular private LAN or is routed along the path specified by the private line. FIG. 7 illustrates an embodiment of the invention in which both private line and private LAN services can be accommodated in a single classifier device, and thus in the same network hardware. This also has the advantage of accommodating different types of private LAN mechanisms, such as VLAN or MPLS (Multiple Protocol Labeling Service).

The classifier 700, which is similar to the classifier mentioned in other embodiments of the invention, can be broken down into two functional components. As a packet's tags are extracted in the classifier 700, it is unknown whether the packet belongs to a private line service or belongs to a private LAN service. The first functional prong of the classifier 700 is a search function 710 (which is used, for instance, in the flow tag lookup 610 discussed above). The search function 710 utilizes a lookup capability to determine whether the packet belongs to a private line service or a private LAN service. The search function 710 returns a default route, which is the actual route the packet will take if the packet is a private line packet. If the search function 710 determines that the packet belongs to a private LAN service, then the customer ID and MAC Destination Address tag can be input to a hash table 725 (e.g., in a similar manner as 620, 625 and 630, discussed above), which generates a different flow ID for the private LAN service data. The flow ID from search 710 and the flow ID from hash table 725 are then input to a selection mechanism 740 (e.g., such as selector 640), which decides which of these flow IDs is the appropriate route and hence, the appropriate flow ID. The appropriate route may be the best or most efficient route and/or the route that satisfies private LAN characteristics and/or requirements. Such a scheme can be implemented in the hardware shown in FIG. 6, for example, since both a search table and hash table can be utilized.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A method of classifying data in a data classifier deployed in a network device, the network device including a plurality of ports coupled to a heterogeneous communications network, the method comprising the steps of:
receiving a data packet at one of the plurality of ports of the network device, the data packet including a first portion;
receiving the first portion of the data packet at the data classifier;
extracting a plurality of tags and a logical port identifier (ID) from the first portion, the plurality of tags including one or more of a flow tag, a media access control destination address tag, a media access control source address tag, a priority tag and a balancer tag;
determining a flow ID representative of a network service on the heterogeneous communications network associated with the data packet, the step of determining the flow ID including a flow tag lookup process, a media access control destination address lookup process, a media access control source address learning process and an output flow ID selection process;
determining a priority ID;
combining the flow ID and the priority ID to create a queue ID, wherein the flow tag lookup process receives as inputs the flow tag and the logical port ID and provides as outputs a first output flow ID to the output flow ID selection process, a customer ID to both the media access control destination address lookup process and the media access control source address learning process and an input flow ID to the media access control source address learning process.

2. The method of claim 1, wherein the step of receiving the data packet includes checking whether a packet type of the data packet matches a port type of the receiving one of the plurality of ports.

3. The method of claim 2, wherein the step of checking further includes generating a type error tag if the packet type does not match the port type.

4. The method of claim 1, wherein the step of extracting the plurality of tags includes storing the tags in a tag memory.

5. The method of claim 4, wherein the step of determining a flow ID includes, first, reading one or more of the plurality of tags from the tag memory.

6. The method of claim 1, wherein the flow tag is used to derive one or more of an input flow ID, an output flow ID and a customer ID.

7. The method of claim 1, wherein the network service includes one or more private line service or a private local area network service.

8. The method of claim 1, wherein the step of determining the flow ID uses one or more of the plurality of tags and the logical port ID.

9. The method of claim 8, wherein the plurality of tags includes one or more of a flow tag, a media access control destination address tag and a media access control source address tag.

10. The method of claim 9, wherein the flow tag is used to derive one or more of an input flow ID, an output flow ID and a customer ID.

11. The method of claim 1, wherein the media access control destination address lookup process:
receives as inputs the customer ID and the media access control destination address tag;
accesses a hash table; and
provides as outputs a second output flow ID and an output flow ID selector to the output flow ID selection process.

12. The method of claim 11, wherein the media access control source address learning process:
receives as inputs the customer ID, the input flow ID and the media access control source address tag;
accesses the hash table; and
provides as output learned flow parameters to the hash table.

13. The method of claim 12, wherein the output flow ID selection process:
receives as inputs the first output flow ID, the second output flow ID and the output flow ID selector; and
provides as output the flow ID.

14. The method of claim 1, wherein the step of determining the flow ID further includes:
generating a balanced flow ID; and
using the balanced flow ID as the flow ID for creating the queue ID.

15. The method of claim 14, wherein the step of generating the balanced flow ID uses one or more of the plurality of tags.

16. The method of claim 15, wherein the plurality of tags includes a balancer tag.

17. The method of claim 1, wherein the step of determining the priority ID uses one or more of the plurality of tags.

18. The method of claim 17, wherein the plurality of tags includes a priority tag.

19. A data classifier deployed in a network device, the network device including a plurality of ports coupled to a heterogeneous communications network, comprising:
a tag extraction unit capable of extracting a plurality of tags and a logical port identifier (ID) from a first portion of a data packet, the data packet having been received at one of the plurality of ports of the network device, wherein the plurality of tags includes one or more of a flow tag, a media access control destination address tag, a media access control source address tag, a priority tag and a balancer tag;
a tag lookup engine including a flow tag lookup coupled to the tag extraction unit, a media access control destination address lookup coupled to the tag extraction unit, the flow tag lookup and a hash table, a media access control source address learner coupled to the tag extraction unit, the flow tag lookup and the hash table and an output flow ID selector coupled to the flow tag lookup, the media access control destination lookup and the queue ID selector, wherein the tag lookup engine is coupled to the tag extraction unit and capable of:
determining a flow ID from one or more of the plurality of tags and the logical port ID, the flow ID representing a network service on the heterogeneous communications network associated with the data packet; and
determining a priority ID; and
a queue ID generator coupled to the tag lookup engine and capable of combining the flow ID and the priority ID to create a queue ID.

20. The device of claim 19, wherein the tag extraction unit includes a tag checker capable of determining whether a packet type of the data packet matches a port type of the receiving one of the plurality of ports.

21. The device of claim 20, wherein the tag checker is further capable of generating a type error tag if the packet type does not match the port type.

22. The device of claim 20, wherein the tag checker includes a tag memory capable of storing the plurality of tags.

23. The device of claim 22, wherein the tag lookup engine is further capable of accessing the one or more of the plurality of tags in the tag memory.

24. The device of claim 19, wherein the flow tag is used to derive one or more of an input flow ID, an output flow ID and a customer ID.

25. The device of claim 19, wherein the network service includes one or more private line service or a private local area network service.

26. The device of claim 19, wherein the flow tag lookup is capable of:
   receiving the flow tag and the logical port ID as inputs; and
   providing as outputs:
      a first output flow ID to the output flow ID selector;
      a customer ID to both the media access control destination address lookup and the media access control source address learner; and
      an input flow ID to the media access control source address learner.

27. The device of claim 26, wherein the media access control destination address lookup is capable of:
   receiving the customer ID and the media access control destination address tag as inputs;
   accessing the hash table; and
   providing a second output flow ID and an output flow ID selector to the output flow ID selector as outputs.

28. The device of claim 27, wherein the media access control source address learner is capable of:
   receiving the customer ID, the input flow ID and the media access control source address tag as inputs;
   accessing the hash table; and
   providing learned flow parameters to the hash table as output.

29. The device of claim 28, wherein the output flow ID selector is capable of:
   receiving the first output flow ID, the second output flow ID and the output flow ID selector as inputs; and
   providing the flow ID to the queue ID generator as output.

30. The device of claim 29, wherein the tag lookup engine further includes a priority tag lookup coupled to the tag extraction unit, the output flow ID selector, and the queue ID generator.

31. The device of claim 30, wherein the priority tag lookup is capable of:
   receiving the priority tag and flow ID as inputs; and
   providing the priority ID to the queue ID generator as output.

32. The device of claim 31, wherein the tag lookup engine further includes a balancer tag lookup coupled to the tag extraction unit, the output flow ID selector and the queue ID generator.

33. The device of claim 32, wherein the balancer tag lookup is capable of:
   receiving the balancer tag and the flow ID as inputs; and
   providing a balanced flow ID to the queue ID generator as output.

34. The device of claim 33, wherein the queue ID generator is further capable of combining the balanced flow ID and the priority ID to create the queue ID.

35. The device of claim 34, wherein the data classifier is fabricated on a single die.

36. The device of claim 35, wherein the data classifier is fabricated on a single functional block on the single die.

37. The device of claim 19, wherein the data classifier is fabricated on a single die.

38. The device of claim 37, wherein the data classifier is fabricated on a single functional block on the single die.

* * * * *